March 7, 1944. W. H. HANNAY ET AL 2,343,293
PROCESS FOR THE PURIFICATION OF MANGANOUS SULPHATE SOLUTIONS
Filed Feb. 28, 1942
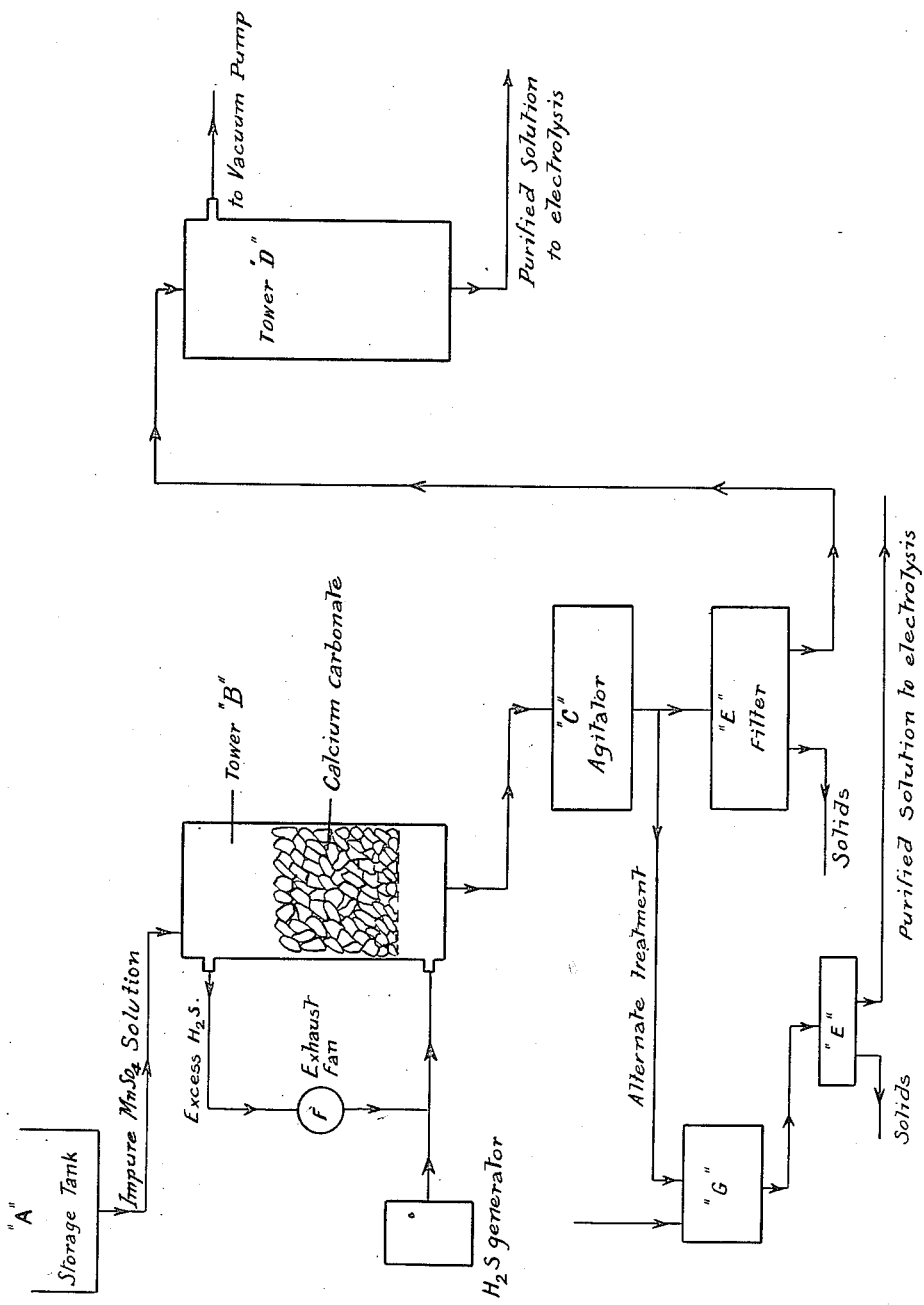
Inventors
William H. Hannay
Basil J. Walsh
by
J. Harold Fichter
ATTY.

Patented Mar. 7, 1944

2,343,293

UNITED STATES PATENT OFFICE.

2,343,293

PROCESS FOR THE PURIFICATION OF MANGANOUS SULPHATE SOLUTIONS

William Henry Hannay, Trail, British Columbia, and Basil Joseph Walsh, Quebec, Quebec, Canada, assignors to The Consolidated Mining and Smelting Company of Canada, Limited, Montreal, Quebec, Canada, a company of the Dominion of Canada Application February 28, 1942, Serial No. 432,878

7 Claims. (Cl. 23—117)

This invention relates to a process for the purification of manganous sulphate solutions and is particularly directed to providing an extremely simple and highly effective method for the precipitation of metallic impurities and their removal from such solutions to render these solutions sufficiently pure for the subsequent electrodeposition of metallic manganese therefrom.

This application is a continuation-in-part of and substitute for application Serial No. 268,606, filed April 18, 1939.

It is well known that manganese sulphate solutions, prepared by suitable treatment of manganese ores or compounds, will ordinarily contain such soluble metallic impurities as were originally present in the manganiferous materials. The presence of these soluble metallic impurities, such as nickel, cobalt, zinc, lead, arsenic, antimony, iron, copper, and cadmium, is very undesirable inasmuch as any one or more of them, unless substantially completely removed from the solution prior to electrolysis, will prevent the cathodic deposition of metallic manganese.

It is also well known, in the electrodeposition of metallic manganese, that the purity of the electrolyte is essential and advantage has been taken of various known chemical reactions to effect the separation of the impurities. For example, it is known that the major portion of impurities, such as arsenic and antimony, may be removed by means of ferric hydroxide and that nickel, if present as an impurity, may be removed by treatment with certain xanthates. We have found, however, that while known methods of purification may be suitable for certain types of manganiferous ores, yet in the treatment of other types of such ores, it is extremely difficult, if not impossible, to purify the solution sufficiently by known methods to ensure the cathodic deposition of metallic manganese in the subsequent electrolysis of the solution.

We have found that manganous sulphate solutions, containing impurities such as set out above, may be purified by using an extremely simple but highly effective method which includes the steps of exposing the solution to reaction with an excess of hydrogen sulphide while maintaining the pH value of the solution within a range which is sufficiently high to ensure the complete precipitation of the impurities in the form of sulphides but not high enough to cause the precipitation of manganous sulphide. We have found, by maintaining the pH value of the solution within the range of from pH 5 to pH 6, and the temperature of the solution not higher than 25° C., that the conversion of the metallic impurities to sulphide form can be effected most satisfactorily without the precipitation of appreciable amounts of manganese as manganous sulphide and without resolution of any of the impurities.

We have found further that when a manganous sulphate solution is exposed to reaction with hydrogen sulphide in the presence of calcium carbonate in substantial excess of the amount required to combine with the sulphuric acid as it is formed in the reaction between the hydrogen sulphide and the metallic sulphate impurities, during which reaction the impurities are converted to sulphide form, the pH value of the solution remains substantially constant. Under these conditions, the metallic impurities, such as nickel, cobalt, zinc, lead, arsenic, antimony, iron, copper and cadmium, converted to sulphide form by reaction with the hydrogen sulphide, precipitate from the solution without concurrent precipitation of manganous sulphide.

The process of the present invention includes, in general, the steps of reacting a manganous sulphate solution, containing metallic impurities in sulphate form, with hydrogen sulphide gas, in amount sufficient to cause the substantially complete conversion of the metallic sulphate impurities to sulphide form, in the presence of calcium carbonate maintained in substantial excess of the amount necessary to neutralize the sulphuric acid formed in the reaction between the hydrogen sulphide and the metallic sulphate impurities to assure the presence of solid calcium carbonate during the course of the treatment, said carbonate compound being effective in the presence of hydrogen sulphide and manganous sulphate in maintaining the pH value of the solution within the range of from pH 5 to pH 6, and maintaining the solution at a temperature not higher than 25° C. during the course of the treatment.

The manner in which we operate our purification method to attain the desired results will be understood from the following description, reference being made to the accompanying drawing in which various steps of the process are illustrated diagrammatically; the accompanying drawing illustrates in flow-sheet form a preferred embodiment of my process.

In the preferred embodiment of our invention described and illustrated herein, the manganiferous material, such as manganese in oxide or carbonate form and containing impurities such as nickel, cobalt, zinc, lead, arsenic, antimony, iron, copper, and cadmium, is treated with sulphuric acid to form manganous sulphate solution. This solution, which will ordinarily contain impurities such as those set out hereinabove, is preferably first treated to remove substantially all the iron by well-known procedures involving oxidation and precipitation, and is then stored in storage tank A, from which it is allowed to flow at a predetermined rate into tower B.

The tower B is charged with a suitable carbonate compound, such as calcium carbonate, in lump form, through which the manganous sulphate solution is permitted to flow while exposed to the action of a stream of hydrogen sulphide gas which is preferably made to flow counter-currently with respect to the flow of the solution. Tower B is preferably a closed tower. According to our preferred practice, the hydrogen sulphide gas is admitted at or near the base and the excess gas, on reaching the top of the tower, is recirculated, being withdrawn by fan F and re-admitted at the base of the tower with the fresh incoming stream of gas. It will be understood, of course, that this step of the process could be operated by causing the gas to flow concurrently with the solution, provision being made for the gas to enter at the top of tower B and to be withdrawn at or near the base. The counter-current method, however, offers the advantage of ensuring better and more complete intermixing of the hydrogen sulphide with the solution during its passage through the tower. The temperature of the solution is maintained at about 25° C. or lower as we have found that above 25° C. manganous sulphide is precipitated from sulphate solutions.

In tower B, the hydrogen sulphide reacts with and converts the metallic impurities, such as nickel, cobalt, zinc, lead, arsenic, antimony, iron, copper and cadmium, from sulphate into sulphide form. During the course of the reaction, sulphuric acid is formed in amount chemically equivalent to the amount of sulphate impurities converted into sulphide. As the reaction proceeds, the continuous formation of sulphuric acid would normally progressively lower the pH value of the solution until the hydrogen ion concentration thereof would be sufficient to prevent the precipitation of the sulphides of the metallic impurities and would tend to cause the resolution of the previously precipitated impurities. This lowering of the pH value of the solution, however, is prevented by the use, in tower B, of the calcium carbonate which is present in that tower in substantial excess of the amount required to combine with the sulphuric acid as it is formed during the course of the treatment. In this manner, the acid is neutralized as it is formed and the pH value of the solution is stabilized and remains substantially constant at a value which ensures the complete precipitation of the sulphides of the various impurities with very little, if any, precipitation of manganous sulphide.

The carbonate compound, maintained in substantial excess in tower B, further acts to a certain extent as a filter. Under ordinary circumstances, therefore, it is necessary to wash the carbonate compound occasionally with weak acid, and to flush the resulting sludge, containing the metallic sulphides, out of the tower. The sludge may then be discarded to waste or it may be treated for the recovery of any of the valuable constituents thereof in a manner similar to that described hereinafter for the recovery of metallic sulphide solids separated in the subsequent filtering step.

During the reactions involving the hydrogen sulphide, the metallic sulphate impurities and the carbonate compound in tower B, small amounts of carbon dioxide are liberated which, ordinarily, are soluble in and carried away by the manganous sulphate solution. In extreme cases, it is possible that an amount of carbon dioxide, in excess of that which would be soluble in the solution, might be generated, in which case it would be preferable to prevent its accumulation by treating the effluent hydrogen sulphide gas in a suitable manner prior to recirculating it.

Tower B is also designed to treat efficiently and effectively the maximum amount of solution with the minimum amount of hydrogen sulphide gas, this gas preferably being circulated in closed circuit at a rate sufficient to maintain an atmosphere of hydrogen sulphide in the tower.

The manganous sulphate solution, carrying precipitated impurities in suspension, is withdrawn from tower B and, if desired, may be passed into agitator C, for further treatment to ensure the complete precipitation of the sulphides of the metallic impurities. The manganous sulphate solution is thoroughly agitated in agitator C, with an excess of finely pulverized calcium carbonate. The solution leaving tower B or agitator C, as the case may be, is passed to filter press E wherein the metallic sulphides, carried in suspension from the preceding step, are separated from the manganous sulphate solution.

We have found that the filtering of the manganous sulphate solution may be effected much more readily and efficiently, if small amounts of finely divided calcium carbonate, held in suspension in the solution, are introduced into the filter to act as a suitable filter aid. The excess calcium carbonate in this manner assists in the formation of a filter cake which is easily removed from the filter press and which prevents the pores of the filter from becoming choked.

The clear filtrate withdrawn from filter press E is passed into tower D wherein it is treated to reduce the residual hydrogen sulphide present in the solution to as low a concentration as may be desired. This treatment is preferably carried out by allowing the solution to trickle over baffles in tower D, which is kept under suitable vacuum. The solution leaving tower D is in a sufficiently pure condition to ensure that on the subsequent electrolysis thereof, the electrodeposition of substantially pure manganese may be readily effected.

In operating the present process, the pH of the manganous sulphate solution is stabilized at a substantially constant value of 5.3 due to the presence of the calcium carbonate in substantial excess of that amount required to neutralize the sulphuric acid as it is formed. At this pH value, the metallic sulphide impurities are precipitated from the solution as they are formed in the reaction between the metallic sulphate impurities and the hydrogen sulphide. The precipitation of the metallic sulphides takes place principally in tower B and to a lesser extent in agitator C.

It will be understood that the various steps of the process can be modified or alternative steps followed without departing from the scope of the invention. For example, if the original manganous sulphate solution carries a relatively high percentage of metallic impurities, it may be advisable to recirculate the solution from agitator C to tower B to ensure the complete precipitation of the sulphides of the metallic impurities from the solution. The process may be carried on as a continuous operation by continuously bleeding off the solution at the base of agitator C and feeding it to filter press E at a rate approximately equivalent to the rate at which the solution is first drawn from storage tank A or, alternatively, the process may be operated intermittently as a batch operation.

The process may be operated according to a further modification in which tower B is dispensed with altogether and in which the precipitation of the sulphides of the metallic impurities is carried out solely in agitator C or in a series of such agitators. In this modification of the process, with excess hydrogen sulphide present, the pulverized carbonate compound is introduced directly into an agitator in an amount in excess of that required to neutralize the sulphuric acid as it is formed. Where more than one agitator is used, the carbonate compound is added in the first and subsequent agitators.

The residual hydrogen sulphide present in the solution leaving tower B or agitator C, as the case may be, may be removed, to any extent desired, by methods alternative to that described hereinbefore, involving the use of tower D. For example, the solution leaving agitator C is passed to vessel G, into which may be introduced sufficient ammonia or other equivalent chemical, such as calcium hydroxide, which would serve to raise the pH value of the solution to about pH 6.5. Under these conditions, any excess hydrogen sulphide present is removed as manganous sulphide. The solution leaving vessel G is then passed to filter press E, the clear filtrate from which is then in a highly purified state and may be passed to the electrolytic step of the process.

Any valuable constituents of the metallic sulphide solids separated in filter press E may be readily recovered if so desired. For example, any manganous sulphide present in these solids may be separated from other constituents by leaching the solids with acid sufficiently dilute that it dissolves only the manganous sulphide. Any cobalt or nickel present may be recovered by leaching with a more concentrated acid.

Iron is usually a constituent of manganese ores. It is preferred to remove the bulk of the iron present in the solution obtained from the leaching of such manganese ores, by following well known procedures involving acidification, oxidation, neutralization and precipitation, prior to the treatment of such solutions with hydrogen sulphide. As is well known, the removal of iron as outlined will remove substantial amounts of arsenic and antimony and, in the case of an ore which contains unusually large amounts of these elements, will facilitate their complete removal by the subsequent treatment with hydrogen sulphide in the manner described hereinbefore.

In the operation of the present purification method, it is essential that the pH value of the solution be maintained sufficiently high to ensure the complete precipitation of metallic impurities in sulphide form but not high enough to cause the precipitation of manganous sulphide.

It has been found, in the treatment of sulphate solutions, that the presence of an excess of calcium carbonate has the effect of neutralizing the sulphuric acid as it is formed in the reaction between the hydrogen sulphide and the metallic impurities in sulphate form and also of stabilizing the pH of the solution at a substantially constant value at which the complete precipitation of the metallic impurities in sulphide form is effected without precipitation of manganous sulphides from the solution.

The precipitation of the sulphides takes place principally in tower B and to a lesser extent in agitator C, the temperature being maintained at about 25° C. or lower. At pH values even slightly below pH 5, the nickel present in the solution cannot be precipitated out of the solution in sulphide form and, if the pH value were permitted to fall progressively below pH 5, the remainder of the sulphide impurities would redissolve. At approximately pH 5.6, there is a slight tendency for the manganese to precipitate as manganous sulphide, which tendency increases as the pH value of the solution increases until at pH 6, the manganous sulphide is precipitated to an appreciable extent.

The carbonate compound used in tower B and agitator C is selected, therefore, having in mind the cost of the compound itself, its value as a neutralizing agent, its ability to maintain constantly the pH value of the solution within the limits set out hereinabove, and the ability of its cation to give a relatively low solubility product with the anion of the solution undergoing purification. Preferably, the carbonate compound should be charged in lump form into tower B. We have found, for example, by maintaining a substantial excess of limestone in tower B, that the pH value of the solution is stabilized at approximately pH 5.3. When manganese carbonate, in excess, is used in place of limestone in tower B, it has been found that the pH value increases to about pH 6, at which pH value appreciable quantities of manganous sulphide are precipitated with the sulphide impurities. The pH value of the solution, resulting from the use of a compound such as sodium carbonate in excess in tower B is too high to permit satisfactory operating results to be obtained, and there is the further disadvantage that the reaction products resulting from the use of sodium carbonate are quite soluble in sulphate solutions.

Exemplifying the operation of the present process, a manganous sulphate solution, containing 72 grams of manganese per litre, was treated with an excess of pulverized C. P. calcium carbonate and was found to have a pH value of pH 5.3. After treating the solution with hydrogen sulphide for a period of two hours, the pH value of the solution was found to be pH 5.3 and the solution still contained 72 grams of manganese per litre. After further treating the solution for an additional period of two hours, the pH value was still pH 5.3 and the manganese content remained at 72 grams per litre. The solution thus showed no precipitation of manganese during the course of the treatment, which was carried out at temperatures below 25° C., and the pH value of the solution remained constant at pH 5.3.

In contradistinction to the results obained by the use of a manganous sulphate solution, a manganous chloride soluton was treated in a manner similar to that outlined above and entirely different results were obtained. The manganous chloride solution contained originally 48 grams of manganese per litre and after addition of an excess of pulverized C. P. calcium carbonate, the solution had a pH value of pH 4.7. After treating the solution with hydrogen sulphide for a period of three and one-half hours, the pH value of the solution had dropped to pH 4.0 and the manganese content had dropped to 27 grams per litre, showing a precipitation of manganese during the three and one-half hour treatment of 21 grams per litre or about 44% of the manganese originally present in the solution. The temperature of the solution was maintained below 25° C.

It will be observed that while the present method is extremely satisfactory for the treatment of manganous sulphate solutions, it would hardly be considered practicable for the treatment of manganous chloride solutions in view of the precipitation of manganese as sulphide when manganous chloride solution is gassed with $H_2S$ in the presence of excess calcium carbonate for the purpose of precipitating metallic impurities. This difference in behaviour of manganous sulphate solution and of manganous chloride solution appears to be due to fundamental differences in the dissociation characteristics of the salts which determine the hydrogen ion concentration of these solutions respectively. In the sulphate solution, the salts concerned are manganous sulphate and calcium sulphate, the latter being formed on the addition of calcium carbonate to the solution. In the chloride solution, the salts concerned are manganous chloride and calcium chloride, the latter being formed on the addition of calcium carbonate to the solution.

The hydrogen ion concentration of neutral manganous sulphate solution, when no calcium carbonate is present, is about pH 7.0 and although hydrolysis of the manganous sulphate occurs to a slight extent at this pH, this hydrolysis is very slow and is soon arrested if the pH of the solution is caused to fall below a value of 7.0. On the other hand, the hydrogen ion concentration of neutral manganous chloride solution, when no calcium carbonate is present, is about pH 6.5, at which pH the hydrolysis of manganous chloride is found to be fairly rapid and is not arrested until the pH of the solution is caused to fall below a value of about 4.5.

When calcium carbonate in excess is added to a dilute solution of sulphuric acid, the resulting hydrogen ion concentration of the solution will be about pH 5.3, which is the pH value of neutral calcium sulphate solution. When calcium carbonate in excess is added to a dilute solution of hydrochloric acid, the hydrogen ion concentration of the solution will be about pH 5.3, which is the pH value of neutral calcium chloride solution.

In a solution of manganous sulphate in which an excess of calcium carbonate is present, some calcium sulphate will be formed and the pH value of the solution will be stabilized at about pH 5.3, which is the pH value of neutral calcium sulphate solution. At this pH and at temperatures below about 25° C., no hydrolysis of manganous sulphate to manganous hydroxide will occur in this solution as this pH is well below the pH range in which such hydrolysis can occur. Consequently, there is no manganous hydroxide available to react with $H_2S$ during gassing of this solution and, therefore, no precipitation of manganous sulphide will take place in this solution under these conditions.

On the other hand, when calcium carbonate in excess is added to the manganous chloride solution, calcium chloride will be formed and the solution will tend to attain a pH of 5.3 which is the hydrogen ion concentration of neutral calcium chloride solution. Due, however, to the relatively high dissociation constant of the chloride solution, with consequent side reactions ensuing, which lead to the formation of complex chlorine compounds, the pH of the solution after the addition of calcium carbonate, and before gassing with $H_2S$, may be considerably lower than 5.3. This chloride solution will have a pH value in the range in which hydrolysis of the manganous chloride to manganous hydroxide can occur under these conditions. On gassing this chloride solution with $H_2S$, the manganous hydroxide is converted into manganous sulphide which then precipitates.

In the treatment of manganous sulphate solutions according to our method, we have found that although the degree of hydrolysis of manganous sulphate is negligible at 25° C., it tends to increase as the temperature is raised above this point but, even at higher temperatures, it is still considerably less than that occurring in manganous chloride solutions under the same conditions of treatment.

In the operation of our process, the manganous sulphate solution to be purified may contain ammonium sulphate. The presence of ammonium sulphate in the solution has no appreciable effect on the operation of our purification process nor does it in any way affect the reactions discussed above. In this case, the ammonium sulphate remains in solution throughout the process and will be contained in the clear filtrate from the filter press E.

It will be understood that the practice of the invention is not limited to the specific modifications set out hereinabove. Further modifications may become apparent to those skilled in the art in the light of the teachings herein without departing from the scope of the invention as defined in the appended claims.

What we claim as new and desire to protect by Letters Patent of the United States is:

1. A process for the purification of manganous sulphate solutions which comprises reacting a manganous sulphate solution, containing metallic impurities in sulphate form, with hydrogen sulphide gas, in amount sufficient to cause the substantially complete conversion of the metallic sulphate impurities to sulphide form, in the presence of calcium carbonate maintained in substantial excess of the amount necessary to neutralize the sulphuric acid formed in the reaction between the hydrogen sulphide and the metallic sulphate impurities to assure the presence of solid calcium carbonate during the course of the treatment, said carbonate compound being effective in the presence of hydrogen sulphide and manganous sulphate in maintaining the pH value of the solution within the range of from pH 5 to pH 6, and maintaining the solution at a temperature not higher than 25° C. during the course of the treatment.

2. A process for the purification of manganous sulphate solutions which comprises feeding a stream of manganous sulphate solution, containing metallic impurities in sulphate form, into a reaction chamber charged with calcium carbonate and exposing the solution to reaction with hydrogen sulphide gas in amount sufficient to cause the substantially complete conversion of the metallic sulphate impurities to sulphide form, maintaining the calcium carbonate in the reaction chamber in substantial excess of the amount necessary to neutralize the sulphuric acid formed in the reaction between the hydrogen sulphide and the metallic sulphate impurities to assure the presence of solid calcium carbonate during the course of the treatment, said calcium carbonate being effective in the presence of hydrogen sulphide and manganous sulphate in maintaining the pH value of the solution within the range of from pH 5 to pH 6, maintaining the solution at a temperature not higher than 25° C. during the course of the treatment, withdrawing the solution and precipitated sulphides from the reaction chamber and separating the precipitated sulphides from the purified solution.

3. A process for the purification of manganous sulphate solutions which comprises feeding a stream of manganous sulphate solution, containing metallic impurities in sulphate form, into a reaction chamber charged with calcium carbonate and exposing the solution to reaction with hydrogen sulphide gas flowing in conutercurrent relation therewith and in amount sufficient to cause the substantially complete conversion of the metallic sulphate impurities to sulphide form, maintaining the calcium carbonate in the reaction chamber in substantial excess of the amount necessary to neutralize the sulphuric acid formed in the reaction between the hydrogen sulphide and the metallic sulphate impurities to assure the presence of solid calcium carbonate during the course of the treatment, said calcium carbonate being effective in the presence of hydrogen sulphide and manganous sulphate in maintaining the pH value of the solution within the range of from pH 5 to pH 6, maintaining the solution at a temperature not higher than 25 C. during the course of the treatment, withdrawing the solution and precipitated sulphides from the reaction chamber, and separating the precipitated sulphides from the purified solution.

4. A process for the purification of manganous sulphate solutions which comprises feeding a stream of manganous sulphate solution containing metallic impurities in sulphate form into a reaction chamber containing, in suspension, an excess of calcium carbonate, exposing the solution to reaction with hydrogen sulphide gas in amount sufficient to cause the substantially complete conversion of the metallic sulphate impurities to sulphide form, maintaining the calcium carbonate in the suspension in substantial excess of the amount necessary to neutralize the sulphuric acid formed in the reaction between the hydrogen sulphide and the metallic sulphate impurities to assure the presence of solid calcium carbonate during the course of the treatment, said calcium carbonate being effective in the presence of hydrogen sulphide and manganous sulphate in maintaining the pH value of the solution within the range of from pH 5 to pH 6, maintaining the solution at a temperature not higher than 25° C. during the course of the treatment, withdrawing from the reaction chamber the solution containing excess calcium carbonate and precipitated sulphides and separating the excess calcium carbonate and precipitated sulphides from the purified solution.

5. A process for the purification of manganous sulphate solutions which comprises feeding a stream of manganous sulphate solution, containing metallic impurities in sulphate form, into a reaction chamber charged with calcium carbonate and exposing the solution to reaction with hydrogen sulphide gas in amount sufficient to cause the substantially complete conversion of the metallic sulphate impurities to sulphide form, maintaining the calcium carbonate in the reaction chamber in substantial excess of the amount necessary to neutralize the sulphuric acid formed in the reaction between the hydrogen sulphide and the metallic sulphate impurities to assure the presence of solid calcium carbonate during the course of the treatment, said calcium carbonate being effective in the presence of hydrogen sulphide and manganous sulphate in maintaining the pH value of the solution within the range of from pH 5 to pH 6, maintaining the solution at a temperature not higher than 25° C. during the course of the treatment, withdrawing the solution and precipitated sulphides from the reaction chamber, separating the precipitated sulphides from the purified solution, and removing the excess hydrogen sulphide from the purified solution.

6. A process for the purification of manganous sulphate solutions containing metallic impurities in sulphate form which comprises acidifying the solution and oxidizing the iron present to convert it to the ferric state, raising the pH value of the solution sufficiently to precipitate iron as ferric hydroxide, separating the ferric hydroxide from the solution together with the metallic impurities precipitated therewith, feeding the solution into a reaction chamber charged with calcium carbonate and exposing the solution to reaction with hydrogen sulphide gas in amount sufficient to cause the substantially complete conversion of the metallic sulphate impurities to sulphide form, maintaining the calcium carbonate in the reaction chamber in substantial excess of the amount necessary to neutralize the sulphuric acid formed in the reaction between the hydrogen sulphide and the metallic sulphate impurities to assure the presence of solid calcium carbonate during the course of the treatment, said calcium carbonate being effective in the presence of hydrogen sulphide and manganous sulphate in maintaining the pH value of the solution within the range of from pH 5 to pH 6, maintaining the solution at a temperature not higher than 25° C. during the course of the treatment, withdrawing the solution and precipitated sulphides from the reaction chamber and separating the precipitated sulphides from the purified solutions.

7. A process for the purification of manganous sulphate solutions which comprises feeding a stream of manganous sulphate solution, containing metallic impurities in sulphate form, into a reaction chamber charged with calcium carbonate and exposing the solution to reaction with hydrogen sulphide gas in amount sufficient to cause the substantially complete conversion of the metallic sulphate impurities to sulphide form, maintaining the calcium carbonate in the reaction chamber in substantial excess of the amount necessary to neutralize the sulphuric acid formed in the reaction between the hydrogen sulphide and the metallic sulphate impurities to assure the presence of solid calcium carbonate during the course of the treatment, withdrawing the manganous sulphate solution from the reaction chamber and passing it to a second reaction chamber wherein it is agitated in the presence of an excess of finely divided calcium carbonate, the calcium carbonate in each of said reaction chambers being effective in the presence of hydrogen sulphide and manganous sulphate in maintaining the pH value of the solution within the range of from pH 5 to pH 6, and maintaining the solution at a temperature not higher than 25° C. during the course of the treatment in the reaction chambers, withdrawing the solution containing excess calcium carbonate and precipitated sulphides from the second reaction chamber, and separating the excess calcium carbonate and precipitated sulphides from the purified solution.

WILLIAM HENRY HANNAY.
BASIL JOSEPH WALSH.